(12) United States Patent
Heilig et al.

(10) Patent No.: US 6,722,662 B2
(45) Date of Patent: Apr. 20, 2004

(54) METALLIC CYLINDER HEAD GASKET

(75) Inventors: Markus Heilig, Betzdorf (DE);
Christoph Hilgert, Overath (DE);
Fabrice Audibert, Erkrath (DE)

(73) Assignee: Federal-Mogul Sealing Systems GmbH, Herdorf (DE)

( * ) Notice: Subject to any disclaimer, the term of this patent is extended or adjusted under 35 U.S.C. 154(b) by 0 days.

(21) Appl. No.: 10/046,664

(22) Filed: Jan. 16, 2002

(65) Prior Publication Data

US 2002/0105148 A1 Aug. 8, 2002

(Under 37 CFR 1.47)

(30) Foreign Application Priority Data

Jan. 26, 2001 (DE) ......................... 101 01 604

(51) Int. Cl.[7] .............................. F02F 11/00; F16J 15/08
(52) U.S. Cl. ........................ 277/600; 277/592; 277/595
(58) Field of Search ................. 277/592–595, 277/601, 600

(56) References Cited

U.S. PATENT DOCUMENTS

| 4,721,315 | A | * | 1/1988 | Ueta ........................... 277/593 |
| 4,836,562 | A | * | 6/1989 | Yoshino ...................... 277/595 |
| 5,161,809 | A | * | 11/1992 | Matsushita et al. ......... 277/601 |
| 5,277,434 | A | * | 1/1994 | Kestly et al. ................ 277/592 |
| 5,310,196 | A | * | 5/1994 | Kawaguchi et al. ........ 277/592 |
| 5,568,932 | A | * | 10/1996 | Tanaka et al. ............... 277/595 |
| 5,588,657 | A | * | 12/1996 | Fujisawa et al. ............ 277/595 |
| 5,628,518 | A | * | 5/1997 | Ushio et al. ................. 277/593 |
| 5,639,101 | A | * | 6/1997 | Tanaka et al. ............... 277/593 |
| 5,664,790 | A | * | 9/1997 | Tanaka et al. ............... 277/595 |
| 5,791,659 | A | * | 8/1998 | Takada et al. ............... 277/593 |
| 6,135,459 | A | * | 10/2000 | Hiramatsu et al. .......... 277/593 |
| 6,139,025 | A | * | 10/2000 | Miyaoh ....................... 277/593 |

FOREIGN PATENT DOCUMENTS

EP           797029 A1   *   9/1997   ............. F16J/15/08

* cited by examiner

*Primary Examiner*—Anthony Knight
*Assistant Examiner*—Christopher J. Boswell
(74) *Attorney, Agent, or Firm*—Venable LLP; Stuart I. Smith

(57) ABSTRACT

A metal cylinder head gasket includes a spacer plate; a sealing layer superposed on the spacer plate; an opening in the spacer plate and the sealing layer for surrounding a combustion chamber of an internal-combustion engine and a full bead provided in the sealing layer and surrounding the opening. The full bead has a crest, and first and second bead feet situated radially inward and, respectively, radially outward of the crest. An annular overlay surrounds the opening and is positioned between the spacer plate and the sealing layer and is in engagement with the full bead. The annular overlay has a radially inner edge face in alignment with the opening edges; and a radially outer edge face situated between the crest and the second bead foot. The sealing layer further has a half bead surrounding the full bead and being spaced radially outward from the second bead foot.

4 Claims, 1 Drawing Sheet

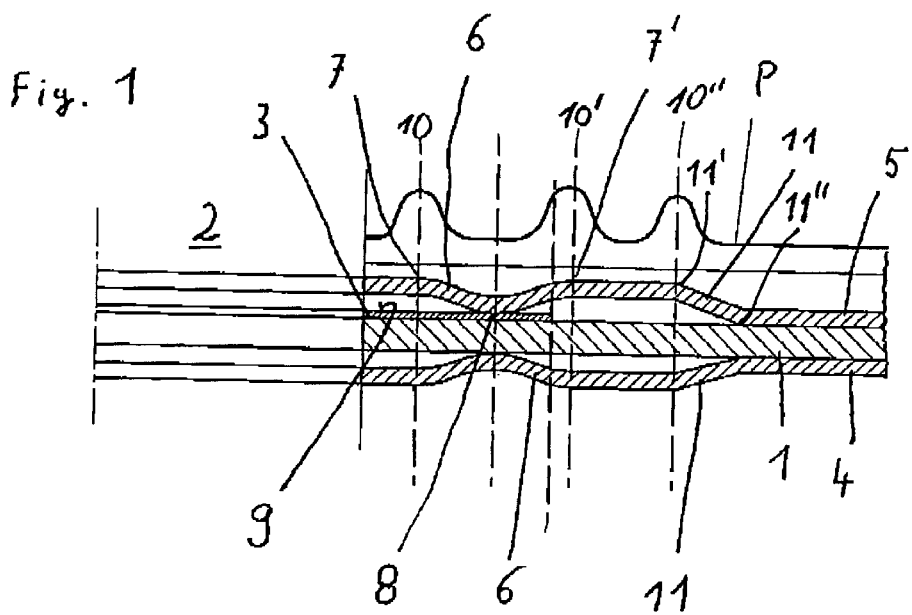

METALLIC CYLINDER HEAD GASKET

CROSS REFERENCE TO RELATED APPLICATION

This application claims the priority of German Application No. 101 01 604.2 filed Jan. 16, 2001, which is incorporated herein by reference.

BACKGROUND OF THE INVENTION

This invention relates to a metallic cylinder head gasket for an internal-combustion engine. The gasket has at least one sealing layer and a spacer layer and is further provided with openings which, when the gasket is installed, are in alignment with the combustion chambers of the engine. The gasket has a flat portion which surrounds the openings. The sealing layer has a bead having an inner and an outer bead foot and a bead crest (full bead) which, adjoining the flat region, surrounds the respective openings. The spacer layer is provided with an annular overlay whose inner circumferential face is flush with the edge of the respective gasket opening and whose outer circumferential face extends radially up to the region of the bead crest.

The sealing principle of metallic sealing gaskets is based on the presence of an elastic sealing zone. Therefore, about the combustion chambers individual layers of the gasket are provided with beads which form elastic sealing zones. During operation the beads are exposed to continuous pressure changes. The spring force of the spring stiffness of the beads is affected by the shape of the beads and the thickness of the metal layer. The spring characteristic of the beads may be changed only within narrow limits. The region about the combustion chambers is, during operation of the internal-combustion engine, exposed to a higher stress than the remaining surface region of the gasket. To seal such a region securely, it is necessary to apply at that location a high surface pressure which is effected by increasing the material thickness of the gasket along the edge of the combustion chamber. This is achieved, for example, by folding over a metal layer or by providing separate overlays which are bonded to one of the metal layers. At the same time, in many modes of application, the increase of thickness is so designed that in the installed state the beads are protected against a full flattening caused by pressure.

A cylinder head gasket of the above-outlined type is described, for example, in German Offenlegungsschrift (application published without examination) No. 197 51 293. The folded-over metal portion constitutes a pressure limiter for the bead and forms a zone where higher pressure prevails. The bead, however, is situated off the maximum pressure location which is in the area of the thickened material portion and not in the region of the bead. Such a sealing concept has been proven to be satisfactory in diesel engines.

In automotive vehicles operating with Otto engines, however, such a concept is not followed and thus a pressure limiter has been completely abandoned. Thus, the cylinder head gaskets are provided only with beads which surround the combustion chambers. In the installed state of the gasket the beads are completely flattened and take up the maximum pressure, that is, the beads lie in the principal force path.

In European Patent No. 0 574 166, to which corresponds U.S. Pat. No. 5,427,388, a combination of both structural variants is disclosed. The cylinder head gasket disclosed therein has an annular overlay (shim) which in the installed state reaches up to the region of the full bead of the sealing layer. By virtue of such a design, the bead lies in the principal force path. Such a structure is particularly adapted for engines having small web widths between the individual combustion chambers and nevertheless ensures the concentration of a maximum pressure to the region about the combustion chambers.

By virtue of the fact, however, that the annular overlay follows the contour of the bead and does not project beyond the bead crest, the spring characteristic of the bead is changed; the bead becomes harder and thus loses some of its elasticity. Further, in the installed state an extreme contact pressure peak exists in the region of the bead crest. In analogy, such a location represents approximately the support point for a bending beam. Thus, upon pressure application, a roll-off effect over the bead crest occurs, resulting in high oscillation amplitudes in the vertical direction. Such an effect is increased, dependent on the pressures in the combustion chamber.

SUMMARY OF THE INVENTION

It is an object of the invention to provide an improved cylinder head gasket having a dynamic sealing zone which lies in the principal force path and which has a high elasticity to ensure that the gasket may be used for heavy-duty diesel engines.

This object and others to become apparent as the specification progresses, are accomplished by the invention, according to which, briefly stated, the metal cylinder head gasket includes a spacer plate; a sealing layer superposed on the spacer plate; an opening in the spacer plate and the sealing layer for surrounding a combustion chamber of an internal-combustion engine and a full bead provided in the sealing layer and surrounding the opening. The full bead has a crest, and first and second bead feet situated radially inward and, respectively, radially outward of the crest. An annular overlay surrounds the opening and is positioned between the spacer plate and the sealing layer and is in engagement with the full bead. The annular overlay has a radially inner edge face in alignment with the opening edges; and a radially outer edge face situated between the crest and the second bead foot. The sealing layer further has a half bead surrounding the full bead and being spaced radially outward from the second bead foot.

The measures according to the invention ensure that, on the one hand, the spring characteristics in the installed condition remain unchanged and, on the other hand, the contact pressure peak is relocated into the region of the outer bead foot. The adjoining half bead takes up one part of the contact pressure peak, whereby an overall lower stress is obtained for the full bead.

The combination of the features according to the invention is adapted to significantly improve the static pressure conditions. The vertical sealing gap motion in the region of the full bead is significantly reduced, thus enhancing the service life of the cylinder head gasket.

BRIEF DESCRIPTION OF THE DRAWING

FIG. 1 is a fragmentary sectional view of a multilayer metallic cylinder head gasket provided with an annular overlay according to the invention.

DESCRIPTION OF THE PREFERRED EMBODIMENT

According to FIG. 1, on the central spacer layer 1 of a cylinder head gasket a pressure-resistant annular overlay 3 (having a thickness of, for example, between 0.05 mm and 0.20 mm) is positioned around the edge of the opening 2 which is aligned with a combustion chamber of an internal-combustion engine. The spacer layer 1 is sandwiched between two sealing layers 4 and 5 each provided with a full bead 6 at a distance from the opening 2. Each full bead 6 is provided with a radially inner bead foot 7, a radially outer bead foot 7' and a bead crest 8. Above the cylinder head gasket the pressure course P is schematically illustrated for representing the pressure in the cylinder head gasket in its installed state.

The annular overlay 3 extends from the edge of the opening 2 up to between the bead crest 8 and the outer bead foot 7'. Thus, the radially inner edge face of the overlay 3 is flush with the gasket edge defining the opening 2, while the radially outer edge face of the overlay 3 is situated beyond the crest 8 and, at the most, in alignment with the outer bead foot 7'. The bead crest 8 is supported on the annular overlay 3 which has a planar surface 9 so that the full bead 6 lies on the principal force path. In analogy, the imagined point of support of a bending beam is displaced such that it moves into the region of the reversal point of the full bead contour. Since in this region there is no inner contact of the inside of the inner sealing layers with the outer edge of the annular overlay 3, the pressure peak is equalized and the roll-off motion is substantially reduced. Thus, in the region of the bead feet 7, 7' high pressures 10, 10' are obtained.

A half bead 11 is arranged in the vicinity of the outer bead foot 7' (for example, 0.5–2.0 mm therefrom). Such half bead has only one bead foot 11', and its peak 11" levels off to continue in a face-to-face engagement with the spacer layer 1. By virtue of the half bead 11 an additional supporting effect is obtained which has a pressing force 10", corresponding to the pressure forces 10, 10'. As a result, no roll-off effect appears over the bead crest 8.

It will be understood that the above description of the present invention is susceptible to various modifications, changes and adaptations, and the same are intended to be comprehended within the meaning and range of equivalents of the appended claims.

What is claimed is:

1. A metal cylinder head gasket comprising
   (a) a spacer plate;
   (b) a sealing layer superposed on said spacer plate;
   (c) an opening defined by opening edges of said spacer plate and said sealing layer for surrounding a combustion chamber of an internal-combustion engine in an installed state of the gasket;
   (d) a full bead provided in said sealing layer; said bead surrounding said opening and having
      (1) a crest;
      (2) a first bead foot located radially inward of said crest; and
      (3) a second bead foot located radially outward of said crest;
   (e) an annular overlay surrounding said opening and positioned between said spacer plate and said sealing layer; said annular overlay having
      (1) a radially inner edge face in alignment with said opening edges;
      (2) a radially outer edge face situated at a location between said crest and said second bead foot; said location being spaced radially outward from said crest and being located at the most in alignment with said second bead foot;
      (3) a first surface; said bead crest being oriented toward and lying on said first surface; and
      (4) a second surface opposite said first surface; said second surface being in a face-to-face engagement with said spacer plate and being bonded thereto; and
   (f) a half bead provided in said sealing layer; said half bead surrounding said full bead and being spaced radially outward from said second bead foot of said full bead.

2. The metal cylinder head gasket as defined in claim 1, wherein a radial distance between said second bead foot and said half bead is between 0.5 mm and 2.0 mm.

3. The metal cylinder head gasket as defined in claim 1, wherein said annular overlay is welded to said spacer plate.

4. The metal cylinder head gasket as defined in claim 1, wherein a thickness of said overlay is between 0.05 mm and 0.20 mm.

* * * * *